(12) United States Patent
Dasgupta et al.

(10) Patent No.: US 12,608,815 B2
(45) Date of Patent: Apr. 21, 2026

(54) METHOD AND SYSTEM FOR INSTANCE SEGMENTATION OF DENSELY PACKED OBJECTS

(71) Applicant: HCL Technologies Limited, New Delhi (IN)

(72) Inventors: Kinjal Dasgupta, Kolkata (IN); Sharad Joshi, Udaipur (IN); Girin Chutia, Dhemaji (IN); Sainarayanan Gopalakrishnan, Chennai (IN)

(73) Assignee: HCL Technologies Limited, New Delhi (IN)

( * ) Notice: Subject to any disclaimer, the term of this patent is extended or adjusted under 35 U.S.C. 154(b) by 420 days.

(21) Appl. No.: 18/124,612

(22) Filed: Mar. 22, 2023

(65) Prior Publication Data

US 2024/0202928 A1　　Jun. 20, 2024

(30) Foreign Application Priority Data

Dec. 15, 2022　(IN) .............................. 202211072492

(51) Int. Cl.
　*G06T 7/12*　　　(2017.01)
　*G06T 5/77*　　　(2024.01)
　　　(Continued)

(52) U.S. Cl.
　CPC .................. *G06T 7/12* (2017.01); *G06T 5/77* (2024.01); *G06V 10/46* (2022.01); *G06V 10/60* (2022.01);
　　　(Continued)

(58) Field of Classification Search
　CPC ... G06T 7/12; G06T 5/77; G06T 2207/20081; G06T 2207/20084; G06T 7/11;
　　　(Continued)

(56) References Cited

U.S. PATENT DOCUMENTS 10,565,729 B2　2/2020　Vajda et al.
10,713,794 B1　7/2020　He et al.
　　　(Continued)

FOREIGN PATENT DOCUMENTS

CN　　110910334 A　*　3/2020　.............. G06T 7/11
CN　　108898610 B　　11/2020
　　　(Continued)

OTHER PUBLICATIONS

Romera-Paredes et al. (2016). Recurrent Instance Segmentation. In: Leibe, B., Matas, J., Sebe, N., Welling, M. (eds) Computer Vision—ECCV 2016. ECCV 2016. Lecture Notes in Computer Science(), vol. 9910. Springer, Cham. https://doi.org/10.1007/978-3-319-46466-4_19 (Year: 2016).*
(Continued)

*Primary Examiner* — Emily C Terrell
*Assistant Examiner* — Julia Z. Yao
(74) *Attorney, Agent, or Firm* — Kendal M. Sheets

(57) ABSTRACT

A system and method for instance segmentation of densely packed objects is disclosed. The method includes receiving an input image, enhancing the input image to generate an enhanced input image, inputting the enhanced input image to a trained mask R-CNN model to generate a first segmentation map, iteratively predicting one or more missing instances of densely packed objects from the input image based on comparison of a contour map generated for the input image with a contour map generated for the first segmentation map, comparing an area of the one or more missing instances with a predefined threshold value, applying the trained masked R-CNN model on each of the one or more missing instances to generate a second segmentation map, and obtaining a refined segmentation map based on the first segmentation map and the second segmentation map.

18 Claims, 6 Drawing Sheets

(51) Int. Cl.
| | |
|---|---|
| *G06V 10/46* | (2022.01) |
| *G06V 10/60* | (2022.01) |
| *G06V 10/74* | (2022.01) |

(52) U.S. Cl.
CPC .. *G06V 10/761* (2022.01); *G06T 2207/20081* (2013.01); *G06T 2207/20084* (2013.01)

(58) Field of Classification Search
CPC ...... G06V 10/46; G06V 10/60; G06V 10/761; G06V 10/82
See application file for complete search history.

(56) References Cited

U.S. PATENT DOCUMENTS

| | | | |
|---|---|---|---|
| 10,991,101 B2 | 4/2021 | Brada et al. | |
| 11,127,139 B2 | 9/2021 | Zhang et al. | |
| 2016/0379371 A1* | 12/2016 | Chen | G06T 7/12 |
| | | | 382/173 |
| 2017/0109878 A1* | 4/2017 | Yang | G06T 7/0012 |
| 2020/0294239 A1* | 9/2020 | Brada | G06T 7/10 |
| 2020/0388029 A1* | 12/2020 | Saltz | G06V 10/267 |
| 2021/0272295 A1* | 9/2021 | Ahmadi | G06F 18/23 |
| 2022/0237799 A1* | 7/2022 | Price | G06T 7/174 |
| 2022/0245824 A1* | 8/2022 | Liu | G06T 7/11 |
| 2022/0292684 A1* | 9/2022 | Wang | G06N 3/0455 |
| 2023/0186659 A1* | 6/2023 | Martin | G06N 3/0464 |
| | | | 382/133 |
| 2023/0267614 A1* | 8/2023 | Cherian | G06T 7/50 |
| | | | 700/259 |
| 2024/0127455 A1* | 4/2024 | Tang | G06T 7/12 |

FOREIGN PATENT DOCUMENTS

| | | | | |
|---|---|---|---|---|
| KR | 102557748 B1 * | 7/2023 | | G06T 7/11 |
| WO | 2020101246 A1 | 5/2020 | | |

OTHER PUBLICATIONS

Khoreva et al., "Simple Does It: Weakly Supervised Instance and Semantic Segmentation," 2017 IEEE Conference on Computer Vision and Pattern Recognition (CVPR), Honolulu, HI, USA, 2017, pp. 1665-1674, doi: 10.1109/CVPR.2017.181. (Year: 2017).*
McIntosh et al., "Recurrent Segmentation for Variable Computational Budgets," 2018 IEEE/CVF Conference on Computer Vision and Pattern Recognition Workshops (CVPRW), Salt Lake City, UT, USA, 2018, pp. 1729-172909, doi: 10.1109/CVPRW.2018.00216. (Year: 2018).*
Huang et al., "Deep learning based soybean seed classification," 2022 Elsevier B.V., Computers and Electronics in Agriculture, vol. 22, issn 0168-1699. doi: https://doi.org/10.1016/j.compag.2022. 107393. (Year: 2022).*
Yang et al., "A Mask R-CNN based particle identification for quantitative shape evaluation of granular materials," 2021 Elsevier B.V., Power Technology, vol. 392, pp. 296-305. doi: https://doi.org/ 10.1016/j.powtec.2021.07.005. (Year: 2021).*
Konopczyński et al. (2020). Instance Segmentation of Densely Packed Cells Using a Hybrid Model of U-Net and Mask R-CNN. In: Artificial Intelligence and Soft Computing. ICAISC 2020. Lecture Notes in Computer Science(), vol. 12415. Springer, Cham. https:// doi.org/10.1007/978-3-030-61401-0_58 (Year: 2020).*
Chen et al., "TensorMask: A Foundation for Dense Object Segmentation," 2019 IEEE/CVF International Conference on Computer Vision (ICCV), Seoul, Korea (South), 2019, pp. 2061-2069, doi: 10.1109/ICCV.2019.00215. (Year: 2019).*
Wang et al., "Segmentation of dense grain images based on level set model," 2010 3rd International Congress on Image and Signal Processing, Yantai, 2010, pp. 1449-1453, doi: 10.1109/CISP.2010. 5648317. (Year: 2010).*
Liang et al. 2022. "A Fast Deployable Instance Elimination Segmentation Algorithm Based on Watershed Transform for Dense Cereal Grain Images" Agriculture 12, No. 9: 1486. https://doi.org/ 10.3390/agriculture12091486 (Year: 2022).*
Di Tian, Yi Han, Biyao Wang, Tian Guan, Hengzhi Gu, Wei Wei; Review of object instance segmentation based on deep learning; Electronic Imaging; vol. 31—issue No. 4; SPIE digital library; Dec. 6, 2021.
Syed Waqas Zamir, Aditya Arora, Akshita Gupta, Salman Khan, Guolei Sun, Fahad Shahbaz Khan, Fan Zhu, Ling Shao, Gui-Song Xia, Xiang Bai; iSAID: A Large-scale Dataset for Instance Segmentation In Aerial Images; Cornell University; May 30, 2019.
Yosuke Toda, Fumio Okura, Jun Ito, Satoshi Okada, Toshinori Kinoshita, Hiroyuki Tsuji, Daisuke Saisho; Training instance segmentation neural network with synthetic datasets for crop seed phenotyping; Communications Biology; Article No. 173; Apr. 15, 2020.
Hsieh-Fu Tsai, Joanna Gajda, Tyler F.W. Sloan, Andrei Rares, Amy Q. Shen; Usiigaci: Instance-aware cell tracking in stain-free phase contrast microscopy enabled by machine learning; Elsevier; vol. 9; Jan.-Jun. 2019; pp. 230-237.

\* cited by examiner

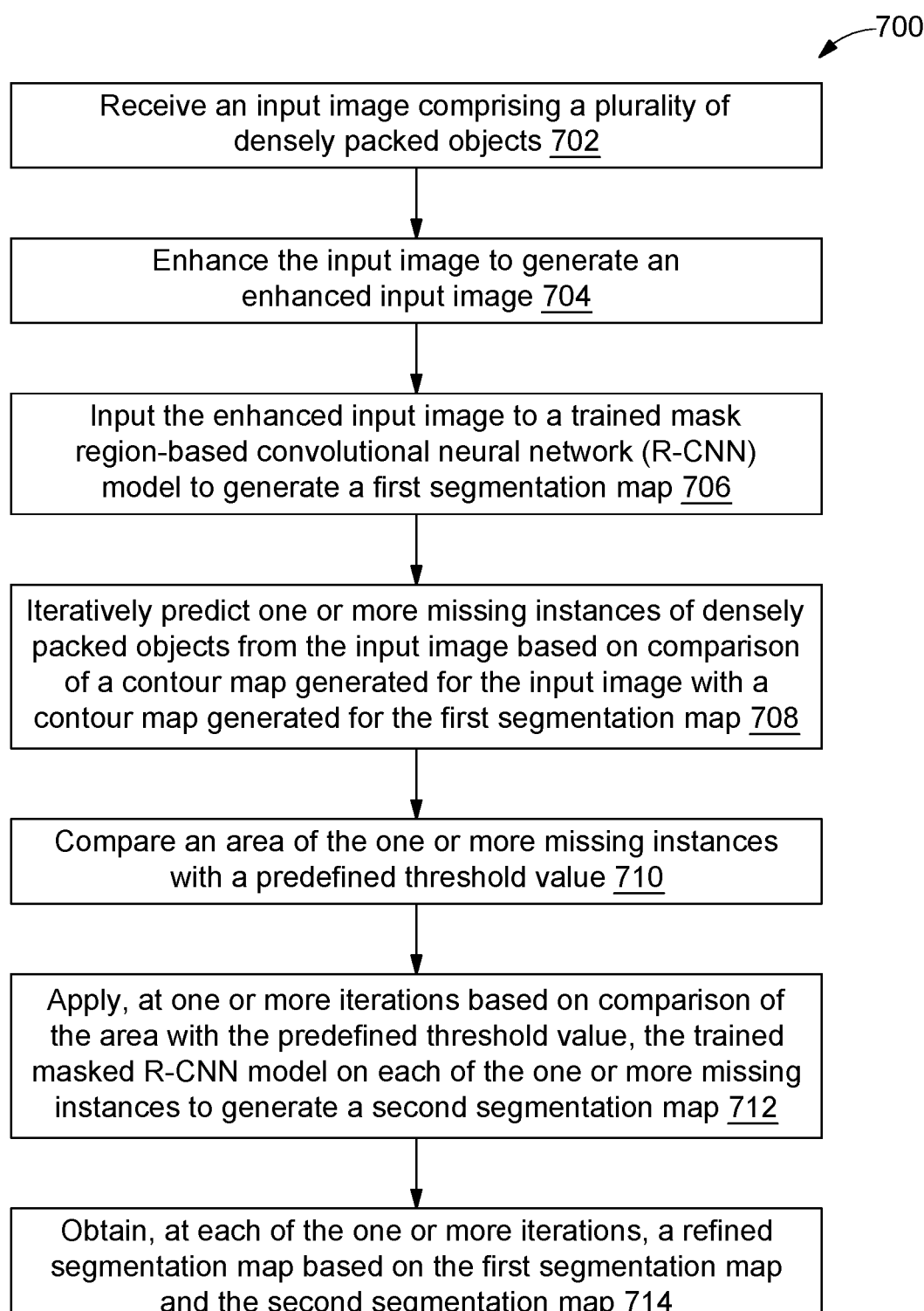

┌─────────────────────────────────────────────┐
│ Receive an input image comprising a plurality of │
│ densely packed objects 702 │
└─────────────────────────────────────────────┘

┌─────────────────────────────────────────────┐
│ Enhance the input image to generate an │
│ enhanced input image 704 │
└─────────────────────────────────────────────┘

┌─────────────────────────────────────────────┐
│ Input the enhanced input image to a trained mask │
│ region-based convolutional neural network (R-CNN) │
│ model to generate a first segmentation map 706 │
└─────────────────────────────────────────────┘

┌─────────────────────────────────────────────┐
│ Iteratively predict one or more missing instances of densely │
│ packed objects from the input image based on comparison │
│ of a contour map generated for the input image with a │
│ contour map generated for the first segmentation map 708 │
└─────────────────────────────────────────────┘

┌─────────────────────────────────────────────┐
│ Compare an area of the one or more missing instances │
│ with a predefined threshold value 710 │
└─────────────────────────────────────────────┘

┌─────────────────────────────────────────────┐
│ Apply, at one or more iterations based on comparison of │
│ the area with the predefined threshold value, the trained │
│ masked R-CNN model on each of the one or more missing │
│ instances to generate a second segmentation map 712 │
└─────────────────────────────────────────────┘

┌─────────────────────────────────────────────┐
│ Obtain, at each of the one or more iterations, a refined │
│ segmentation map based on the first segmentation map │
│ and the second segmentation map 714 │
└─────────────────────────────────────────────┘

FIG. 7

METHOD AND SYSTEM FOR INSTANCE SEGMENTATION OF DENSELY PACKED OBJECTS

TECHNICAL FIELD

This disclosure relates generally to instance segmentation, and more particularly to method and system for instance segmentation of densely packed objects.

BACKGROUND

Instance segmentation is the most crucial tasks in computer vision for detecting and localizing an object in an image. The instance segmentation is a natural sequence of semantic segmentation which may have one of the biggest challenges compared to other segmentation techniques. The main objective of the instance segmentation is to get a view of objects of same class divided into different instances. However, automating this process may not be easy as a number of instances is not known in advance and evaluation of obtained instances is not based on pixels.

Many practical applications require the segmentation of densely packed instances of an object category. For some applications, the number of instances may run into few hundreds. In such a scenario, the segmentation may be challenged by several overlapping/touching instances which may have non-uniform texture depending upon a location of illumination source. Instance tagging may provide additional information for inferring unknown situations, for counting elements belonging to a same class, and for detecting certain objects to be retrieved in robotic tasks. It may be used to a large extent in autonomous driving, medicine, surveillance, plant phenotyping, seed morphology of various cultivars, and alike.

However, the existing segmentation networks, for example, Mask Region-based Convolutional Neural Network (R-CNN) fails to predict proper segmentation maps for densely packed tiny objects which are affected by low-image quality, such as non-uniform illumination, blurring, and low-resolution. The presence of non-uniform illumination, touching and partially overlapping densely packed object instances pose challenges to the instance segmentation performance. For example, some object instances may be missed due to varying textures and configurations of touching and overlapping instances. For some object instances their original structure connectivity may get lost, i.e., predicted segmentation mask may partially covers the object instances. In the presence of very low quantity of training data, existing models tend to predict multiple instances for a single object instance. Moreover, the non-uniform illumination, noisy images, lower spatial resolution poses several challenges which requires usage of pre and post processing steps to ensure a robust instance segmentation performance.

Therefore, in order to provide solutions to the aforementioned drawback, there exists a need to develop an effective method and system that may accurately provide instance segmentation of densely packed object even under a condition of poor input image quality.

SUMMARY OF INVENTION

In one embodiment, a method for instance segmentation of densely packed objects is disclosed. In one example, the method may include receiving an input image. The input image may include a plurality of densely packed objects. The method may further include enhancing the input image to generate an enhanced input image. The method may further include inputting the enhanced input image to a trained mask region-based convolutional neural network (R-CNN) model to generate a first segmentation map. The first segmentation map may include a first set of instances of densely packed objects. The method may further include iteratively predicting one or more missing instances of densely packed objects from the input image based on comparison of a contour map generated for the input image with a contour map generated for the first segmentation map. The method may further include comparing an area of the one or more missing instances with a predefined threshold value. The iterative prediction of the one or more missing instances is performed till value of the area is above the predefined threshold value. The method may further include applying, at one or more iterations based on comparison of the area with the predefined threshold value, the trained masked R-CNN model on each of the one or more missing instances to generate a second segmentation map. The second segmentation map may include the one or more missing instances. The method may further include obtaining, at each of the one or more iterations, a refined segmentation map based on the first segmentation map and the second segmentation map. The refined segmentation map may include the first set of instances and the one or more missing instances, and the refined segmentation map corresponds to input image for a succeeding iteration, till the area of missing instances in a current iteration is above the predefined threshold value.

In another embodiment, a system for instance segmentation of densely packed objects is disclosed. In one example, the system may include a processor and a memory communicatively coupled to the processor, wherein the memory stores processor-executable instructions, which, on execution, may cause the processor to receive an input image. The input image may include a plurality of densely packed objects. The processor-executable instructions, on execution, may further cause the processor to enhance the input image to generate an enhanced input image. The processor-executable instructions, on execution, may further cause the processor to input the enhanced input image to a trained mask region-based convolutional neural network (R-CNN) model to generate a first segmentation map. The first segmentation map may include a first set of instances of densely packed objects. The processor-executable instructions, on execution, may further cause the processor to iteratively predict one or more missing instances of densely packed objects from the input image based on comparison of a contour map generated for the input image with a contour map generated for the first segmentation map. The processor-executable instructions, on execution, may further cause the processor to compare an area of the one or more missing instances with a predefined threshold value. The iterative prediction of the one or more missing instances is performed till value of the area is above the predefined threshold value. The processor-executable instructions, on execution, may further cause the processor to apply, at one or more iterations based on comparison of the area with the predefined threshold value, the trained masked R-CNN model on each of the one or more missing instances to generate a second segmentation map. The second segmentation map may include the one or more missing instances. The processor-executable instructions, on execution, may further cause the processor to obtain, at each of the one or more iterations, a refined segmentation map based on the first segmentation map and the second segmentation map. The refined segmentation map may include the first set of instances and the one or more missing instances, and the refined segmentation map corresponds to input image for a succeeding iteration, till the area of missing instances in a current iteration is above the predefined threshold value.

In yet another embodiment, a non-transitory computer-readable storage medium is disclosed. The non-transitory computer-readable storage medium has computer-executable instructions stored thereon of instance segmentation of densely packed objects. The computer-executable instructions may cause a computer comprising one or more processors to perform operations comprising receiving an input image. The input image may include a plurality of densely packed objects. The computer instructions may further include enhancing the input image to generate an enhanced input image. The computer instructions may further include inputting the enhanced input image to a trained mask region-based convolutional neural network (R-CNN) model to generate a first segmentation map. The first segmentation map may include a first set of instances of densely packed objects. The computer instructions may further include iteratively predicting one or more missing instances of densely packed objects from the input image based on comparison of a contour map generated for the input image with a contour map generated for the first segmentation map. The computer instructions may further include comparing an area of the one or more missing instances with a predefined threshold value. The iterative prediction of the one or more missing instances is performed till value of the area is above the predefined threshold value. The computer instructions may further include applying, at one or more iterations based on comparison of the area with the predefined threshold value, the trained masked R-CNN model on each of the one or more missing instances to generate a second segmentation map. The second segmentation map may include the one or more missing instances. The computer instructions may further include obtaining, at each of the one or more iterations, a refined segmentation map based on the first segmentation map and the second segmentation map. The refined segmentation map may include the first set of instances and the one or more missing instances, and the refined segmentation map corresponds to input image for a succeeding iteration, till the area of missing instances in a current iteration is above the predefined threshold value.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 4A illustrates an exemplary input image of a plurality of densely packed rice grains, in accordance with an exemplary embodiment.

FIG. 4B illustrates a final predicted segmentation map corresponding to the input image of the plurality of densely packed rice grains, in accordance with an exemplary embodiment.

FIG. 5A illustrates an exemplary input image of a plurality of densely packed barley grains, in accordance with an exemplary embodiment.

FIG. 5B illustrates a final predicted segmentation map corresponding to the input image of the plurality of densely packed barley grains, in accordance with an exemplary embodiment.

FIG. 6A illustrates an exemplary input image of a plurality of densely packed cells, in accordance with an exemplary embodiment.

FIG. 6B illustrates a final predicted segmentation map corresponding to the input image of the plurality of densely packed cells, in accordance with an exemplary embodiment.

FIG. 7 is flow chart of a method for instance segmentation of densely packed objects, in accordance with an embodiment

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
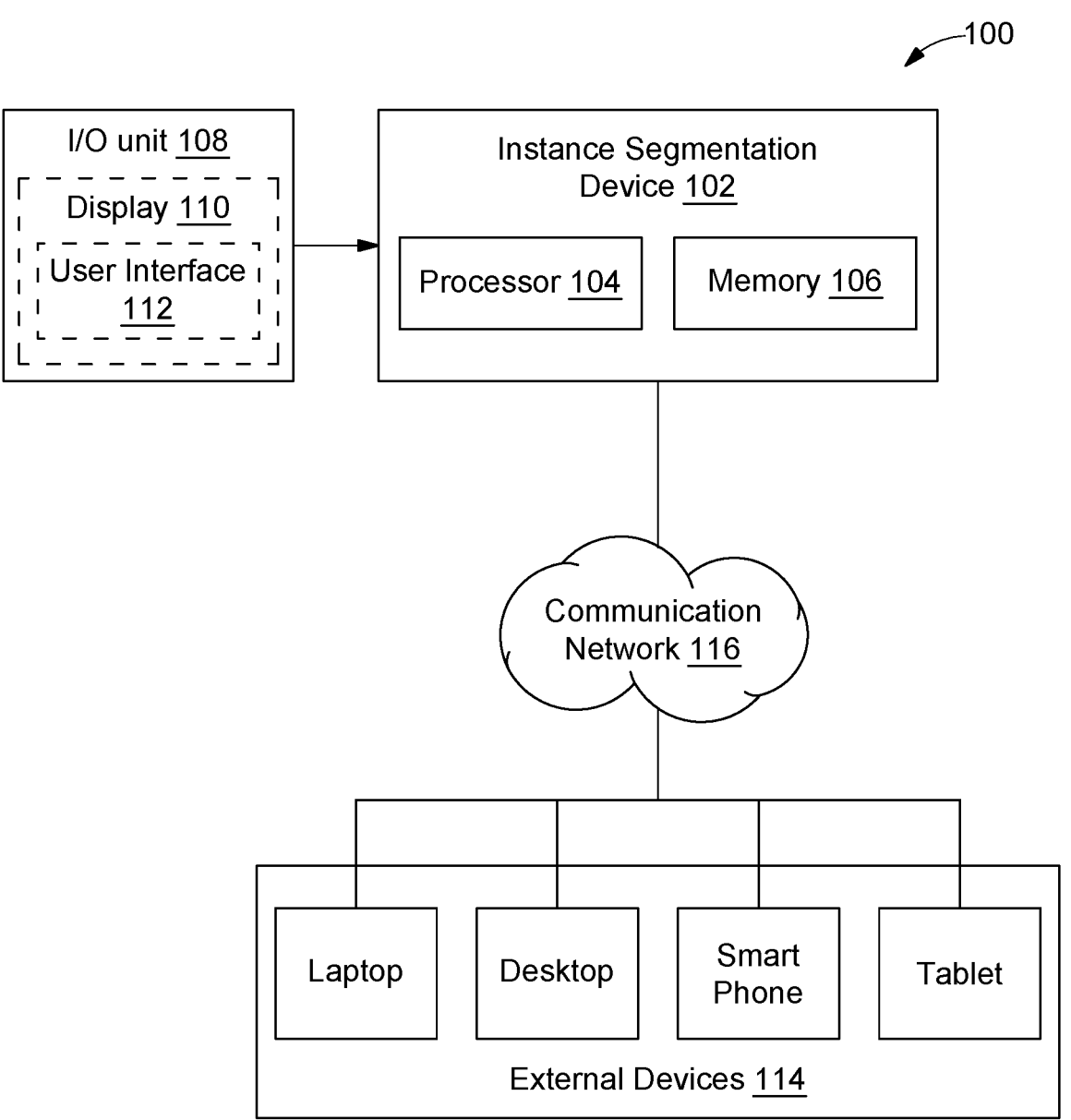
FIG. 1 is an environment diagram illustrating a system for instance segmentation of densely packed objects, in accordance with an embodiment.

Referring now to FIG. 1, an environment diagram of a system 100 for instance segmentation of densely packed objects is illustrated, in accordance with an embodiment. The system 100 may include an instance segmentation device 102 that may be configured to segment a plurality of densely packed objects which may be in one or more instances. The main objective of the instance segmentation is to locate each instance of the plurality of densely packed objects and to find extent of each instance of the plurality of densely packed objects. The system 100 may resolve afore-mentioned problems by generating an accurate segmentation map of one or more instances of densely packed objects even under the conditions of low-image quality, such as, low image resolution, non-uniform illumination, blurring, and small sized object instances. Examples of the instance segmentation device 102 may include, but are not limited to a server, a desktop, a laptop, a notebook, a tablet, a smart-phone, a mobile phone, an application server, or the like. The plurality of densely packed objects may be a large number of densely packed grains or a large number of densely packed cells. Examples of grains may include, but are not limited to, barley grains, wheat grains, oats, corn, millet, rye, and sorghum.

As will be described in greater detail in conjunction with FIGS. 2-7, the instance segmentation device 102 may receive an input image that includes a plurality of densely packed objects. The instance segmentation device 102 may further enhance the input image to generate an enhanced input image. The instance segmentation device 102 may further input the enhanced input image to a trained mask region-based convolutional neural network (R-CNN) model to generate a first segmentation map. The first segmentation map may include a first set of instances of densely packed objects. The instance segmentation device 102 may further iteratively predict one or more missing instances of densely packed objects from the input image based on comparison of a contour map generated for the input image with a contour map generated for the first segmentation map. The instance segmentation device 102 may further compare an area of the one or more missing instances with a predefined threshold value. The iterative prediction of the one or more missing instances may be performed till value of the area is above the predefined threshold value. The instance segmentation device 102 may further apply, at one or more iterations based on comparison of the area with the predefined thresh-old value, the trained masked R-CNN model on each of the one or more missing instances to generate a second seg-mentation map. The second segmentation map may include the one or more missing instances. The instance segmenta-tion device 102 may further obtain, at each of the one or more iterations, a refined segmentation map based on the first segmentation map and the second segmentation map. The refined segmentation map may include the first set of instances and the one or more missing instances, and the refined segmentation map corresponds to input image for a succeeding iteration, till the area of missing instances in a current iteration is above the predefined threshold value.

In an embodiment, the instance segmentation device 102 may include a processor 104 that is communicatively coupled to a memory 106 which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access Memory (SRAM).

The memory 106 may store instructions that, when executed by the processors 104, cause the processor 104 to perform instance segmentation of the plurality of densely packeted objects. The memory 106 may also store various data (e.g., input image of the densely packed objects, enhanced input image, a set of instances of the densely packed objects, a set of synthetic images, refined segmen-tation map, threshold value, copy of segmentation maps obtained after each iteration, etc.) that may be captured, processed, and/or required by the instance segmentation device 102. The memory 106 may be a non-volatile memory (e.g., flash memory, Read Only Memory (ROM), Program-mable ROM (PROM), Erasable PROM (EPROM), Electri-cally EPROM (EEPROM) memory, etc.) or a volatile memory (e.g., Dynamic Random Access Memory (DRAM), Static Random-Access memory (SRAM), etc.). The memory 106 may further include various modules that enable the instance segmentation device 102 to perform instance seg-mentation of the densely packed objects. These modules are explained in detail in conjunction with FIG. 2.

The instance segmentation device 102 may interact with a user via an input/output unit 108. In particular, the instance segmentation device 102 may interact with the user via a user interface 112 accessible via the display 110. Thus, for example, in some embodiments, the user interface 112 may allow the user to provide the input image of the densely packed objects on which the instance segmentation is to be performed. Further, in some embodiments, the instance segmentation device 102 may render results (e.g., a final predicted segmentation map corresponding to the input image with estimated one or more missing instances) to end-user via the user interface 112.

The system 100 may also include one or more external devices 114. In some embodiments, the instance segmenta-tion device 102 may interact with the one or more external devices 114 over a communication network 116 for sending or receiving various data. Examples of the external devices 114 may include, but are not limited to, computer, tablet, smartphone, and laptop. The communication network 116, for example, may be any wired or wireless network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
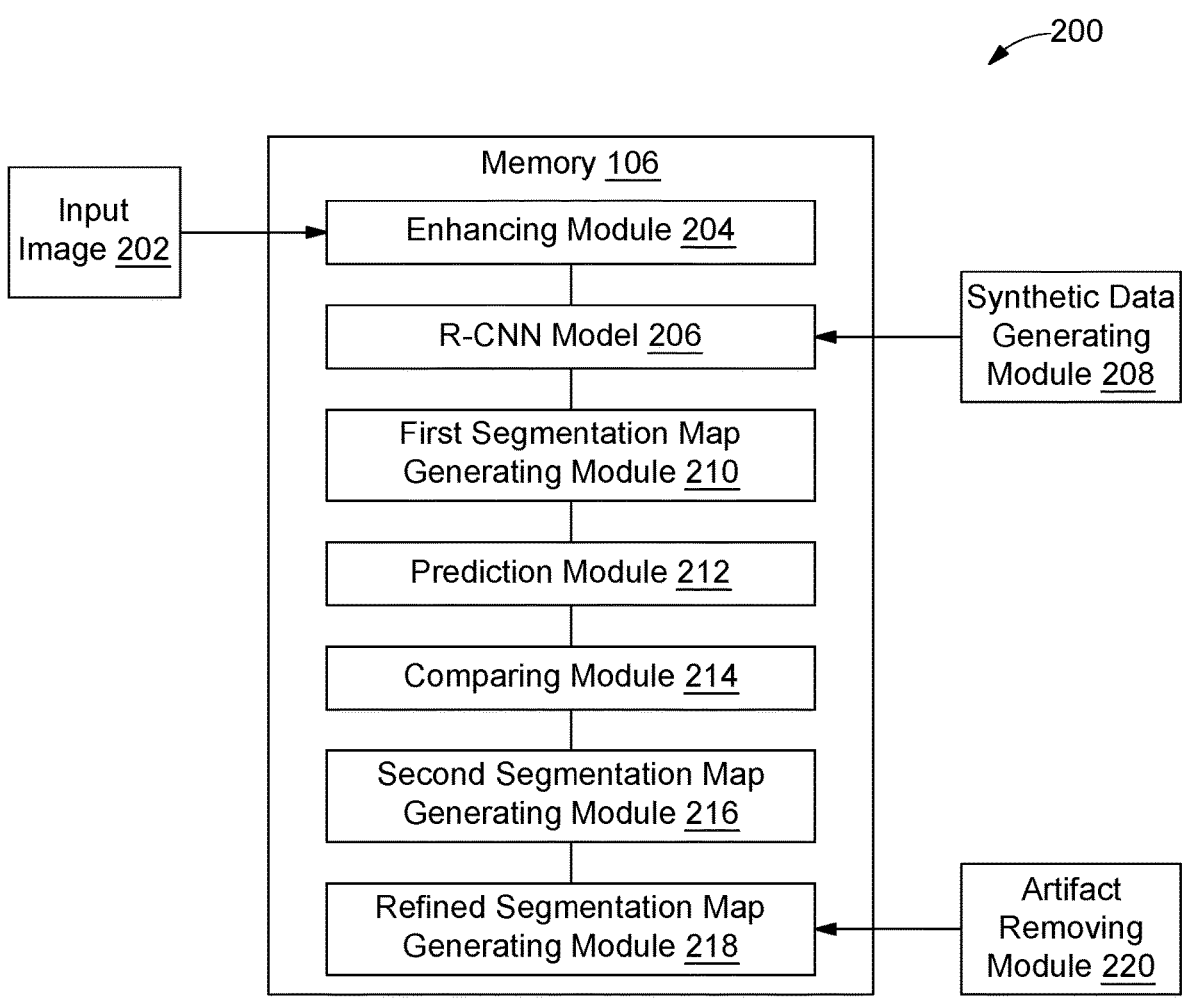
FIG. 2 is a block diagram illustrating various modules within a memory of an instance segmentation device, in accordance with an embodiment.

Referring now to FIG. 2, a block diagram 200 of various modules within the memory 106 of instance segmentation device 102 configured to perform instance segmentation of densely packed objects is illustrated, in accordance with an embodiment of the present disclosure. The memory 106 includes an image enhancing module 204, a R-CNN model 206, a synthetic data generating module 208, a first segmen-tation map generating module 210, a prediction module 212, a comparing module 214, a second segmentation map gen-erating module 216, a refined segmentation map generating module 218, and an artifact removing module 220.

In order to initiate the instance segmentation, the instance segmentation device 102 may first receive an input image 202. The input image 202 may include the plurality of densely packed objects. It may be noted that the input image 202 may include one or more instances of the plurality of densely packed objects. For example, in one instance, the plurality of densely packed objects may be in overlapping/touching state which may have non-uniform texture. In other instance, the plurality of densely packed objects correspond-ing to the input image received may be a low-quality image which may have non-uniform illumination, blurring, and low-resolution.

Upon receiving the input image 202, the image enhancing module 204 may enhance the input image 202 to generate an enhanced input image. The enhanced input image may include improved attribute (for example, visual appearance) of each of the plurality of densely packed objects. In some embodiment, the input image 202 may be enhanced by adjusting contrast and brightness of each of the plurality of densely packed objects associated with the input image 202.

Further, the enhanced input image may be inputted to a trained mask region-based convolutional neural network (R-CNN) model 206 to generate a first segmentation map via a first segmentation map generating module 210. The first segmentation map may include a first set of instances of densely packed objects.

In some embodiments, in order to generate the first segmentation map, the mask R-CNN model is required to be trained using a training dataset. The training dataset may include a set of synthetic images. In particular, very few samples of input image 202 having densely packed object instances may be available for training the R-CNN model 206. Therefore, in order to accurately train the R-CNN model 206, the synthetic data generating module 208 may generate a set of synthetic images using the few samples of input image available. This may be accomplished firstly by manually annotating each of the one or more instances of the densely packed objects from the samples of input image. Further, each of the one or more instances of the densely packed objects annotated may be extracted to construct a blank template image whose background is chosen to be similar as that of real image (for example, the input image). Once the blank template image is constructed, each of the one or more instances of the densely packed objects may further be subjected to data augmentation techniques including rotation/flipping and randomly distributed in the blank template image. It may be noted that each random distribution may create a new synthetic image. Thus, allowing to produce thousands of synthetic images. The variations introduced in the set of synthetic images may help in improving the localization performance.

Further, the prediction module 212 may iteratively predict one or more missing instances of densely packed objects from the input image based on comparison of a contour map generated for the input image with a contour map generated for the first segmentation map. In some embodiments, in order to iteratively predict the one or more missing instances of densely packed objects, the contour maps for the input image and the first segmentation map may be generated using a contour detection technique. Further, the contour map generated for the first segmentation map may be compared with the contour map generated for the input image. Based on the comparing, the one or more missing instances may be estimated from the input image.

The comparing module 214 may be configured to compare an area of the one or more missing instances with a predefined threshold value. It should be noted that the iterative prediction of the one or more missing instances may be performed till value of the area is above the predefined threshold value. This is further explained in detail in conjunction with FIG. 3.

Based on comparison of the area with the predefined threshold value, the trained masked R-CNN model may be applied, at one or more iterations, on each of the one or more missing instances to generate a second segmentation map via the second segmentation map generating module 216. The second segmentation map may include the one or more missing instances.

Further, at each of the one or more iterations, a refined segmentation map may be obtained based on the first segmentation map and the second segmentation map. The refined segmentation map may include the first set of instances and the one or more missing instances, and the refined segmentation map corresponds to input image for a succeeding iteration, till the area of missing instances in a current iteration is above the predefined threshold value. Further, the artifact removing module 220 may remove one or more artifacts from the refined segmentation map. It should be noted that removing the one or more artifacts improve visibility of first set of instances and the one or more missing instances. This is further explained in greater detail in conjunction with FIG. 3.

It should be noted that all such aforementioned modules 204-220 may be represented as a single module or a combination of different modules. Further, as will be appreciated by those skilled in the art, each of the modules 204-220 may reside, in whole or in parts, on one device or multiple devices in communication with each other. In some embodiments, each of the modules 204-220 may be implemented as dedicated hardware circuit comprising custom application-specific integrated circuit (ASIC) or gate arrays, off-the-shelf semiconductors such as logic chips, transistors, or other discrete components. Each of the modules 204-220 may also be implemented in a programmable hardware device such as a field programmable gate array (FPGA), programmable array logic, programmable logic device, and so forth. Alternatively, each of the modules 204-220 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 3:
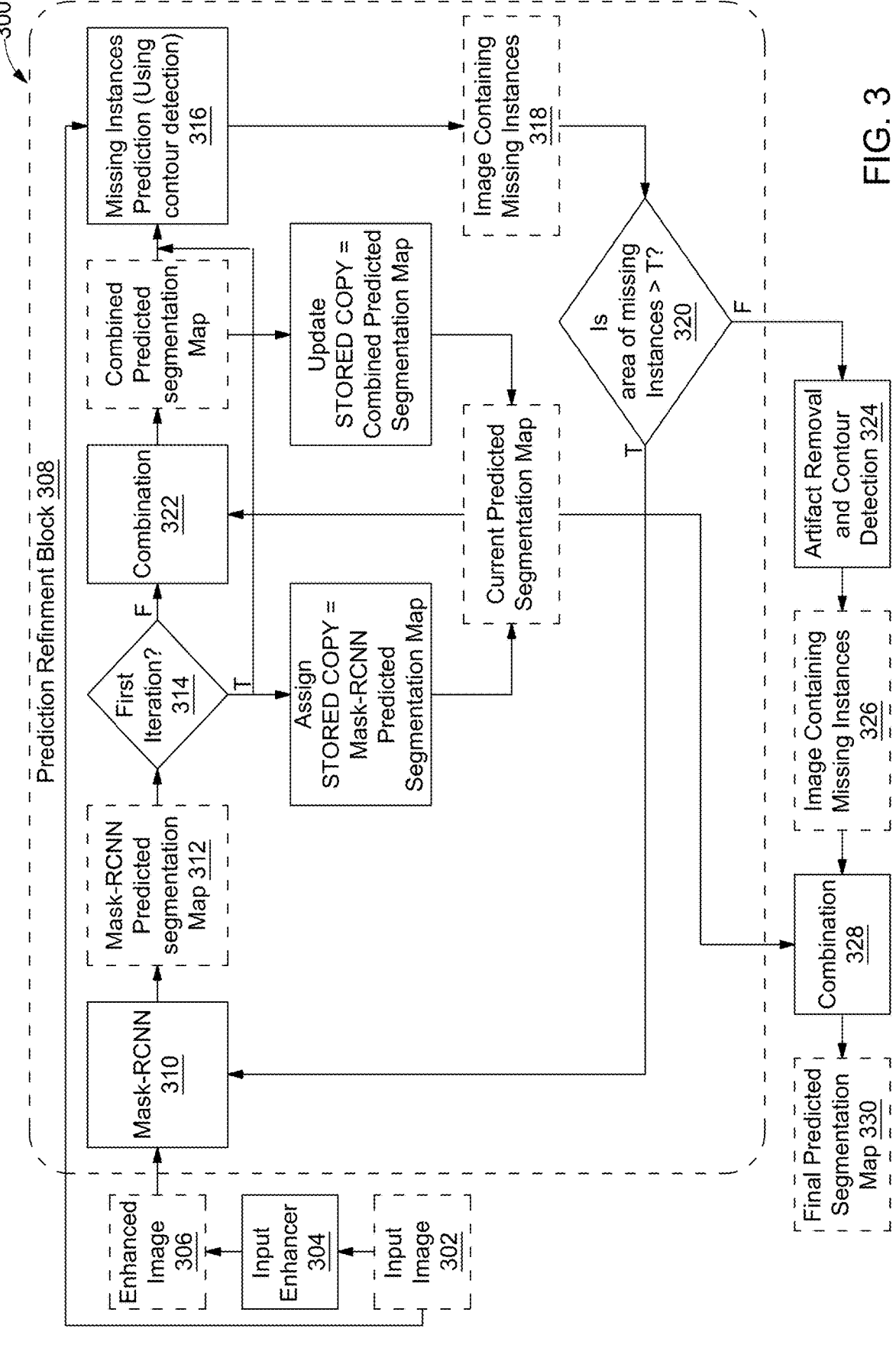
FIG. 3 is a functional block diagram for instance segmentation of densely packed objects, in accordance with an embodiment.

Referring now to FIG. 3, a functional block diagram 300 for instance segmentation of densely packed objects is illustrated, in accordance with an embodiment of the present disclosure. At block 302, an input image may be received. The input image may include a plurality of densely packed objects. In some embodiments, the objects may be, but not limited to a large number of small rice grains, barley grains, or cells that may be densely packed together non uniformly. It may be apparent to a person skilled in the art that the densely packed objects may not be limited to small objects, and may also include aerial view of a herd of animals, a group of people, or cars on a road.

The plurality of densely packed objects within the input image may be received with low light still pose (for example, some portions of the input image, particularly corners and edges may be exposed to very low light) which may cause a significant challenge in getting good results in various tasks of the computer vision community. Therefore, in order to overcome this challenge, an image enhancing module 204 may be incorporated which deals with non-uniform illumination, at block 304. The image enhancing module 204 may be configured to generate an enhanced input image, at block 306. The input image may be enhanced by adjusting contrast and brightness of each of the plurality of densely packed objects associated with the input image. The enhanced image improves the visual appearance of all object instances irrespective of varying illumination levels.

Further, the enhanced input image may be fed as an input to a trained mask RCNN model, at block 310. The mask RCNN is a well-established framework for instance segmentation that may receive a set of synthetic images (which may be generated by the synthetic data generating module 208 as already discussed in FIG. 2) to train the mask RCNN model.

The trained mask RCNN model may then be used to generate a first segmentation map that includes a first set of instances of densely packed objects, at block 312. However, the first segmentation map generated by the trained mask RCNN model may miss out on several instances of densely packed objects. This may be due to very low amount of real training data which may be unable to capture all the variations. Some other factors may include, but are not limited to non-uniform illumination, noise, density, occlusion, camera characteristics, and image resolution.

Therefore, to improve the first segmentation map generated by the mask R-CNN model, a prediction refinement block 308 may be designed. More specifically, the prediction refinement block 308 may iteratively predict one or more missing instances of densely packed objects missed by the trained mask R-CNN based on comparison of a contour map generated for the input image with a contour map generated for the first segmentation map. The motivation for this block is two-fold: (i) instances of densely packed objects of varying configurations are missed and (ii) instances of densely packed objects with non-uniform illumination and varying textures are missed.

In order to iteratively predict the one or more missing instances of densely packed objects, initially, at first iteration 314, the first segmentation map generated by the trained mask R-CNN model and the input image may be subjected to a contour detection. Using the contour detection, the contour maps for the input image and the first segmentation map may be generated. Further, the contour maps for the input image and the first segmentation map may be compared, at block 316. At the time of comparing, the common instances found in both i.e., the input image and the first segmentation map may be removed, and only the one or more missing instances from the input image may be retained. Therefore, based on comparing, the one or more missing instances may be estimated at block 318.

Further, an image including the one or more missing instances may then be fed as input to the trained mask R-CNN model (i.e., the same trained model as used in the earlier step) to obtain a second segmentation map based on comparing an area of the one or more missing instances with a predefined threshold value, at block 320. The second segmentation map may include the one or more missing instances. It may be noted that iterative prediction of the one or more missing instances is performed till value of the area is above the predefined threshold value.

It should be noted that after each iteration, stored copy of previous iteration segmentation maps may be updated by combining a segmentation map of current iteration with an output of a succeeding iteration, at block 322. At each of the one or more iterations, a refined segmentation map may be obtained based on combining the first segmentation map and the second segmentation map. The refined segmentation map may include the first set of instances and the one or more missing instances. The refined segmentation map may correspond to input image for a succeeding iteration, till the area of missing instances in a current iteration is above the predefined threshold value.

The process of finding the one or more missing instances and obtaining the refined segmentation map may be repeated iteratively while a significant amount of one or more missing instances is estimated. The iterative process converges when the number of pixels covered by one or more missing instances reduces below a convergence threshold "T". This threshold may be fixed according to a fraction of number of pixels in an image. The value of convergence threshold "T" is found to be approximately 0.5. In practice, 1 or 2 iterations may be sufficient for convergence.

Once the significant amount of one or more missing instances is estimated, the iteration converges. Due to background artifacts, lightning conditions, and need for faster convergence, few undetected object instances may be left in the refined segmentation map which may be removed by the artifact removal module 220. Therefore, the artifact removal module 220 may remove such artifacts and improves the visibility of undetected object instances, at block 324. Since, these instances may be very few and sparsely distributed, once the artifacts are removed, they may be segmented using the contour detection.

Once the artifact is removed from the one or more missing instances of block 326, the one or more missing instances with artifact removed may further be combined with the segmentation map of the final iteration, at block 328. The combination of these two may produce a final predicted segmentation map, at block 330. The final predicted segmentation map may correspond to the input image that may include the first set of instances of the densely packed objects, the one or more missing instances estimated after the final iteration and the one or more missing instances with removed artifact. The exemplary input image and their corresponding final predicted segmentation maps obtained from the above-mentioned process is illustrated via FIGS. 4A, 4B, 5A, 5B, 6A, and 6B.

Figures 4A, 4B, 5A, 5B, 6A, 6B:
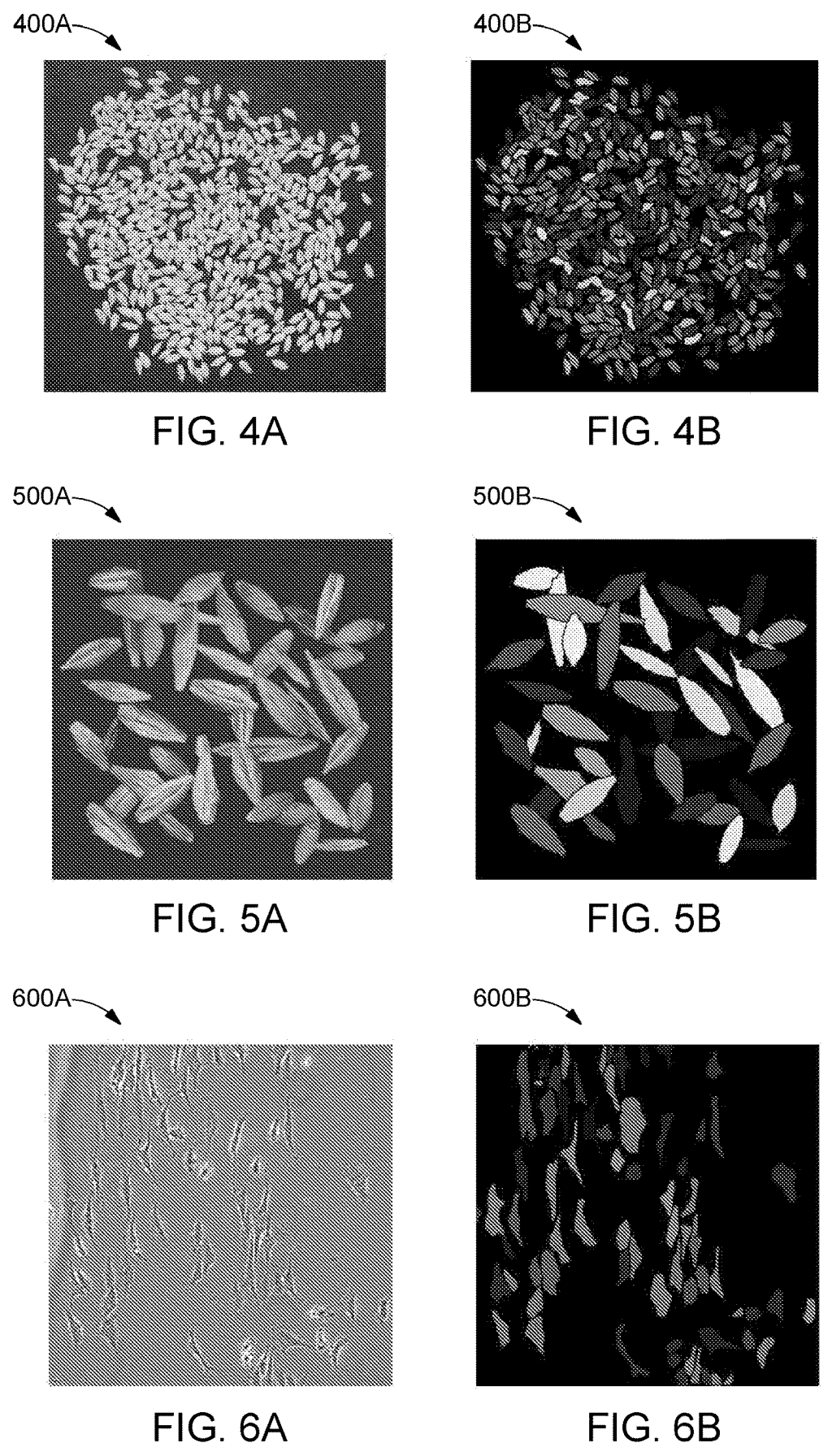

For example, an exemplary input image 400A of a plurality of densely packed rice grains is illustrated in FIG. 4A. The instance segmentation may be applied on the input image 400A to generate a final predicted segmentation map 400B. The final predicted segmentation map 400B corresponding to the input image 400A of the plurality of densely packed rice grains is depicted via FIG. 4B.

Referring now to FIG. 5A, an exemplary input image 500A of a plurality of densely packed barley grains is illustrated, in accordance with an exemplary embodiment. The instance segmentation may be applied on the input image 500A to generate a final predicted segmentation map 500B. The final predicted segmentation map 500B corresponding to the input image 400A of the plurality of densely packed barley grains is depicted via FIG. 5B.

Referring now to FIG. 6A, an exemplary input image 500A of a plurality of densely packed cells is illustrated, in accordance with an exemplary embodiment. The instance segmentation may be applied on the input image 600A to generate a final predicted segmentation map 600B. The final predicted segmentation map 600B corresponding to the input image 600A of the plurality of densely packed cells is depicted via FIG. 5.

Referring now to FIG. 7, a flow chart of a method 700 for instance segmentation of densely packed objects is illustrated, in accordance with an embodiment. All the steps 702-714 may be performed by the modules 204-220 of the instance segmentation device 102. At step 702, an input image may be received. The input image may include a plurality of densely packed objects. At step 704, the input image may be enhanced to generate an enhanced input image. In some embodiment, the input image may be enhanced by adjusting contrast and brightness of each of the plurality of densely packed objects associated with the input image. The enhanced input image may include improve at least one attribute (for example, visual appearance) of each of the plurality of densely packed objects.

At step 706, the enhanced input image may be inputted to a trained mask region-based convolutional neural network (R-CNN) model to generate a first segmentation map. The first segmentation map may include a first set of instances of densely packed objects. In some embodiments, the mask R-CNN model may be trained using a training dataset that includes a set of synthetic images. The set of synthetic images may be generated by receiving one or more instances of densely packed objects from the input image, manually annotating each of the one or more instances of the densely packed objects, extracting each of the one or more instances of the densely packed objects annotated, upon extraction, constructing a blank template image of the one or more instances having similar characteristics as of the input image of the densely packed objects, and applying data augmentation technique on the blank template image to generate the set of synthetic images.

Once the first segmentation map is generated, further at step 708, one or more missing instances of densely packed objects from the input image may be iteratively predicted based on comparison of a contour map generated for the input image with a contour map generated for the first segmentation map.

In order to iteratively predict the one or more missing instances of densely packed objects, initially, the contour maps may be generated for the input image and the first segmentation map generating using contour detection. Further, the contour map generated for the first segmentation map with the contour map generated for the input image may be compared. Based on comparing the one or more missing instances from the input image may be estimated.

At step 710, an area of the one or more missing instances may be compared with a predefined threshold value. It may be noted that iterative prediction of the one or more missing instances is performed till value of the area is above the predefined threshold value.

At step 712, the trained masked R-CNN model may be applied, at one or more iterations based on comparison of the area with the predefined threshold value, on each of the one or more missing instances to generate a second segmentation map. The second segmentation map include the one or more missing instances.

At step 714, a refined segmentation map may be obtained, at each of the one or more iterations, based on the first segmentation map and the second segmentation map. The refined segmentation map may include the first set of instances and the one or more missing instances. The refined segmentation map may correspond to input image for a succeeding iteration, till the area of missing instances in a current iteration is above the predefined threshold value.

In some embodiments, the one or more artifacts from the refined segmentation map may be removed using an artifact removal module 220. It may be noted that removing the one or more artifacts improve visibility of first set of instances and the one or more missing instances.

Further, the refinement segmentation map with removed artifact may further be combined with the refined segmentation map which may be obtained at the final iteration to achieve a final predicted segmentation map. The final predicted segmentation map may correspond to input image having the first set of instances, the one or more missing instances estimated at the final iteration stage, and the one or more missing instances with the removed artifact.

As will be appreciated by those skilled in the art, the techniques described in the various embodiments discussed above are not routine, or conventional, or well understood in the art. The techniques discussed above provide for instance segmentation of densely packed objects. The disclosed techniques may overcome challenges that may occur during instance segmentation. These challenges may be a presence of non-uniform illumination, touching and partially overlapping densely packed object instances that may affect a performance of instance segmentation. Therefore, the above disclosed techniques have been designed specifically to overcome the problem of generating instance segmentation maps for densely packed object instances of small sizes with varying textures, non-uniform illumination, and noise.

Further, the proposed techniques provide accurate instance segmentation map under the conditions of low-image quality such as low image resolution, non-uniform illumination, blurring, and small sized object instances. The proposed techniques may include a synthetic data generating module that may allow to work with a very few training samples (i.e., input image). Further, the proposed techniques may provide accurate instance segmentation map for touching and overlapping object instances. Further, the proposed techniques may provide accurate instance segmentation map for instances with varying texture which may be arranged in a large number of varying configurations. Further, the proposed techniques may perform well with partially visible object instances occurring at the input image boundary. The proposed techniques may further include the prediction refinement block that is a novel iterative (applied recursively) approach designed to improve the efficacy of instance segmentation. It improves the object detection rate as well as the localization, i.e., mask prediction.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer.

Figure 8:
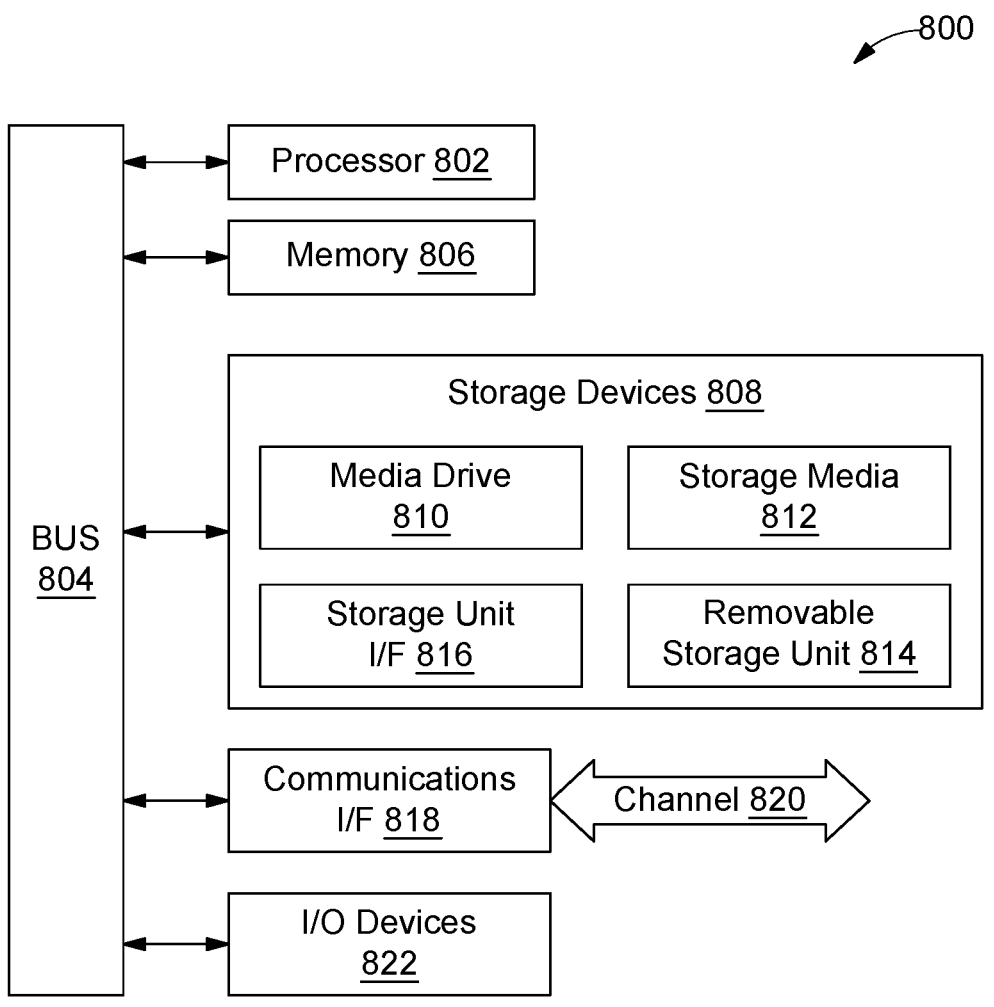
FIG. 8 is a block diagram of an exemplary computer system for implementing embodiments consistent with the present disclosure.

Referring now to FIG. 8, an exemplary computing system 800 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 800 may represent, for example, a user device such as a desktop, a laptop, a mobile phone, personal entertainment device, DVR, and so on, or any other type of special or general-purpose computing device as may be desirable or appropriate for a given application or environment. The computing system 800 may include one or more processors, such as a processor 802 that may be implemented using a general or special purpose processing engine such as, for example, a microprocessor, microcontroller or other control logic. In this example, the processor 802 is connected to a bus 804 or other communication medium. In some embodiments, the processor 802 may be an Artificial Intelligence (AI) processor, which may be implemented as a Tensor Processing Unit (TPU), or a graphical processor unit, or a custom programmable solution Field-Programmable Gate Array (FPGA).

The computing system 800 may also include a memory 806 (main memory), for example, Random Access Memory (RAM) or other dynamic memory, for storing information and instructions to be executed by the processor 802. The memory 806 also may be used for storing temporary variables or other intermediate information during execution of instructions to be executed by the processor 802. The computing system 800 may likewise include a read only memory ("ROM") or other static storage device coupled to bus 804 for storing static information and instructions for the processor 802.

The computing system 800 may also include storage devices 808, which may include, for example, a media drive 810 and a removable storage interface. The media drive 810 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 812 may include, for example, a hard disk, magnetic tape, flash drive, or other fixed or removable medium that is read by and written to by the media drive 810. As these examples illustrate, the storage media 812 may include a computer-readable storage medium having stored therein particular computer software or data.

In alternative embodiments, the storage devices 808 may include other similar instrumentalities for allowing computer programs or other instructions or data to be loaded into the computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from the removable storage unit 814 to the computing system 800.

The computing system 800 may also include a communications interface 818. The communications interface 818 may be used to allow software and data to be transferred between the computing system 800 and external devices. Examples of the communications interface 818 may include a network interface (such as an Ethernet or other NIC card), a communications port (such as for example, a USB port, a micro-USB port), Near field Communication (NFC), etc.

Software and data transferred via the communications interface 818 are in the form of signals which may be electronic, electromagnetic, optical, or other signals capable of being received by the communications interface 818. These signals are provided to the communications interface 818 via a channel 820. The channel 820 may carry signals and may be implemented using a wireless medium, wire or cable, fiber optics, or other communications medium. Some examples of the channel 820 may include a phone line, a cellular phone link, an RF link, a Bluetooth link, a network interface, a local or wide area network, and other communications channels.

The computing system 800 may further include Input/Output (I/O) devices 822. Examples may include, but are not limited to a display, keypad, microphone, audio speakers, vibrating motor, LED lights, etc. The I/O devices 822 may receive input from a user and also display an output of the computation performed by the processor 802. In this document, the terms "computer program product" and "computer-readable medium" may be used generally to refer to media such as, for example, the memory 806, the storage devices 808, the removable storage unit 814, or signal(s) on the channel 820. These and other forms of computer-readable media may be involved in providing one or more sequences of one or more instructions to the processor 802 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into the computing system 800 using, for example, the removable storage unit 814, the media drive 810 or the communications interface 818. The control logic (in this example, software instructions or computer program code), when executed by the processor 802, causes the processor 802 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for instance segmentation of densely packed objects, the method comprising:

receiving an input image comprising a plurality of densely packed objects;

enhancing the input image to generate an enhanced input image;

inputting the enhanced input image to a trained mask region-based convolutional neural network (R-CNN) model to generate a first segmentation map, wherein the first segmentation map comprises a first set of instances of densely packed objects;

iteratively predicting one or more missing instances of densely packed objects from the input image based on comparison of a contour map generated for the input image with a contour map generated for the first segmentation map;

comparing an area of the one or more missing instances with a predefined threshold value, wherein iterative prediction of the one or more missing instances is performed till value of the area is above the predefined threshold value;

applying, at one or more iterations based on comparison of the area with the predefined threshold value, the trained masked R-CNN model on each of the one or more missing instances to generate a second segmentation map, wherein the second segmentation map comprises the one or more missing instances; and obtaining, at each of the one or more iterations, a refined segmentation map based on the first segmentation map and the second segmentation map, wherein the refined segmentation map comprises the first set of instances and the one or more missing instances, and wherein the refined segmentation map corresponds to input image for a succeeding iteration, till the area of missing instances in a current iteration is above the predefined threshold value.

2. The method of claim 1, further comprising removing one or more artifacts from the refined segmentation map using an artifact removal module, wherein removing the one or more artifacts improve visibility of first set of instances and the one or more missing instances.

3. The method of claim 1, wherein the input image is enhanced by adjusting contrast and brightness of each of the plurality of densely packed objects associated with the input image, and wherein the enhanced input image comprises improve at least one attribute of each of the plurality of densely packed objects.

4. The method of claim 1, wherein iteratively predicting the one or more missing instances of densely packed objects comprises:

generating, using contour detection, the contour maps for the input image and the first segmentation map;

comparing the contour map generated for the first segmentation map with the contour map generated for the input image; and estimating the one or more missing instances from the input image, based on the comparing.

5. The method of claim 1, comprises generating a set of synthetic images, wherein generating further comprises:

receiving one or more instances of densely packed objects from the input image;

manually annotating each of the one or more instances of the densely packed objects;

extracting each of the one or more instances of the densely packed objects annotated;

upon extraction, constructing a blank template image of the one or more instances having similar characteristics as of the input image of the densely packed objects; and applying data augmentation technique on the blank template image to generate the set of synthetic images.

6. The method of claim 5, comprises:

training the mask R-CNN model using a training dataset, wherein the training dataset comprises the set of synthetic images.

7. A system for instance segmentation of densely packed objects, the system comprising:

a processor and a memory communicatively coupled to the processor, wherein the memory stores processor-executable instructions, which, on execution, causes the processor to:

receive an input image comprising a plurality of densely packed objects;

enhance the input image to generate an enhanced input image;

input the enhanced input image to a trained mask region-based convolutional neural network (R-CNN) model to generate a first segmentation map, wherein the first segmentation map comprises a first set of instances of densely packed objects;

iteratively predict one or more missing instances of densely packed objects from the input image based on comparison of a contour map generated for the input image with a contour map generated for the first segmentation map;

compare an area of the one or more missing instances with a predefined threshold value, wherein iterative prediction of the one or more missing instances is performed till value of the area is above the predefined threshold value;

apply, at one or more iterations based on comparison of the area with the predefined threshold value, the trained masked R-CNN model on each of the one or more missing instances to generate a second segmentation map, wherein the second segmentation map comprises the one or more missing instances; and obtain, at each of the one or more iterations, a refined segmentation map based on the first segmentation map and the second segmentation map, wherein the refined segmentation map comprises the first set of instances and the one or more missing instances, and wherein the refined segmentation map corresponds to input image for a succeeding iteration, till the area of missing instances in a current iteration is above the predefined threshold value.

8. The system of claim 7, wherein the processor instructions, on execution, further cause the processor to remove one or more artifacts from the refined segmentation map using an artifact removal module, wherein removing the one or more artifacts improve visibility of first set of instances and the one or more missing instances.

9. The system of claim 7, wherein the input image is enhanced by adjusting contrast and brightness of each of the plurality of densely packed objects associated with the input image, and wherein the enhanced input image comprises improve at least one attribute of each of the plurality of densely packed objects.

10. The system of claim 7, wherein to iteratively predict the one or more missing instances of densely packed objects, the processor instructions, on execution, further cause the processor to:

generate, using contour detection, the contour maps for the input image and the first segmentation map;

compare the contour map generated for the first segmentation map with the contour map generated for the input image; and estimate the one or more missing instances from the input image, based on the comparing.

11. The system of claim 7, comprising generating a set of synthetic images, wherein to generate the set of synthetic images, the processor instructions, on execution, further cause the processor to:

receive one or more instances of densely packed objects from the input image;

manually annotate each of the one or more instances of the densely packed objects;

extract each of the one or more instances of the densely packed objects annotated;

upon extraction, construct a blank template image of the one or more instances having similar characteristics as of the input image of the densely packed objects; and apply data augmentation technique on the blank template image to generate the set of synthetic images.

12. The system of claim 11, wherein, the processor instructions, on execution, further cause the processor to:

train the mask R-CNN model using a training dataset, wherein the training dataset comprises the set of synthetic images.

13. A computer program product for instance segmentation of densely packed objects, the computer program product embodied in a non-transitory computer readable storage medium and comprising computer-executable instructions configured for:

receiving an input image comprising a plurality of densely packed objects;

enhancing the input image to generate an enhanced input image;

inputting the enhanced input image to a trained mask region-based convolutional neural network (R-CNN) model to generate a first segmentation map, wherein the first segmentation map comprises a first set of instances of densely packed objects;

iteratively predicting one or more missing instances of densely packed objects from the input image based on comparison of a contour map generated for the input image with a contour map generated for the first segmentation map;

comparing an area of the one or more missing instances with a predefined threshold value, wherein iterative prediction of the one or more missing instances is performed till value of the area is above the predefined threshold value;

applying, at one or more iterations based on comparison of the area with the predefined threshold value, the trained masked R-CNN model on each of the one or more missing instances to generate a second segmentation map, wherein the second segmentation map comprises the one or more missing instances; and obtaining, at each of the one or more iterations, a refined segmentation map based on the first segmentation map and the second segmentation map, wherein the refined segmentation map comprises the first set of instances and the one or more missing instances, and wherein the refined segmentation map corresponds to input image for a succeeding iteration, till the area of missing instances in a current iteration is above the predefined threshold value.

14. The computer program product of claim 13, wherein the computer instructions further configured for removing one or more artifacts from the refined segmentation map using an artifact removal module, wherein removing the one or more artifacts improve visibility of first set of instances and the one or more missing instances.

15. The computer program product of claim 13, wherein the input image is enhanced by adjusting contrast and brightness of each of the plurality of densely packed objects associated with the input image, and wherein the enhanced input image comprises improve at least one attribute of each of the plurality of densely packed objects.

16. The computer program product of claim 13, wherein to iteratively predicting the one or more missing instances of densely packed objects, the computer instructions further configured for:

generating, using contour detection, the contour maps for the input image and the first segmentation map;

comparing the contour map generated for the first segmentation map with the contour map generated for the input image; and estimating the one or more missing instances from the input image, based on the comparing.

17. The computer program product of claim 13, wherein the computer instructions further configured for generating a set of synthetic images, wherein generating further comprises:

receiving one or more instances of densely packed objects from the input image;

manually annotating each of the one or more instances of the densely packed objects;

extracting each of the one or more instances of the densely packed objects annotated;

upon extraction, constructing a blank template image of the one or more instances having similar characteristics as of the input image of the densely packed objects; and applying data augmentation technique on the blank template image to generate the set of synthetic images.

18. The computer program product of claim 17, wherein the computer instructions further configured for training the mask R-CNN model using a training dataset, wherein the training dataset comprises the set of synthetic images.

* * * * *